US006164608A

United States Patent [19]

Schiel, Jr.

[11] Patent Number: 6,164,608

[45] Date of Patent: Dec. 26, 2000

[54] LADDER LEVELING CHOCK SYSTEM

[76] Inventor: William A. Schiel, Jr., 152 W. Oley St., Reading, Pa. 19601-2440

[21] Appl. No.: 09/324,644

[22] Filed: Jun. 3, 1999

[51] Int. Cl.$^{7}$ .................................................... F16M 11/24

[52] U.S. Cl. ........................ 248/188.2; 182/200; 224/609

[58] Field of Search ................................ 248/188.2, 649, 248/351, 188.1; 182/200, 41; 52/126.1; 254/104, 609, 257, 258

[56] References Cited

U.S. PATENT DOCUMENTS

| | | | |
|---|---|---|---|
| 3,993,275 | 11/1976 | Lucas | 248/188.2 |
| 4,830,320 | 5/1989 | Bellows | 248/188.2 |
| 5,249,767 | 10/1993 | Mellen | 248/188.2 |
| 5,339,921 | 8/1994 | Faupel | 182/200 X |
| 5,370,286 | 12/1994 | Newman | 224/151 |

*Primary Examiner*—Anita M. King
*Assistant Examiner*—Gwendolyn Baxter

[57] ABSTRACT

A ladder leveling chock system for maintaining a level surface for resting a ladder thereon. The ladder leveling chock system includes a block with top and bottom faces, an end face, and a pair of side faces. The top and bottom faces converge together at an end vertex extending between the side faces opposite the end face. The bottom face has a resiliently deformable surface provided thereon. The top face is designed for resting a lower end of a rail of a ladder thereon and has a resiliently deformable gripping strip coupled thereto for frictionally enhancing contact between the top face and the lower end of the rail.

9 Claims, 3 Drawing Sheets

LADDER LEVELING CHOCK SYSTEM

BACKGROUND OF THE INVENTION

1. Field of the Invention

The present invention relates to devices for maintaining a level surface for resting a ladder thereon and more particularly pertains to a new ladder leveling chock system for maintaining a level surface for resting a ladder thereon.

2. Description of the Prior Art

The use of devices for maintaining a level surface for resting a ladder thereon is known in the prior art. More specifically, devices for maintaining a level surface for resting a ladder thereon heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1111; U.S. Pat. No. 2222; U.S. Pat. No. 3333; U.S. Pat. No. 4444; U.S. Pat. No. 5555; and U.S. Pat. No. 6666.

While these devices fulfill their respective, particular objectives and requirements, the aforementioned patents do not disclose a new ladder leveling chock system. The inventive device includes a block with top and bottom faces, an end face, and a pair of side faces. The top and bottom faces converge together at an end vertex extending between the side faces opposite the end face. The bottom face has a resiliently deformable surface provided thereon. The top face is designed for resting a lower end of a rail of a ladder thereon and has a resiliently deformable gripping strip coupled thereto for frictionally enhancing contact between the top face and the lower end of the rail.

In these respects, the ladder leveling chock system according to the present invention substantially departs from the conventional concepts and designs of the prior art, and in so doing provides an apparatus primarily developed for the purpose of maintaining a level surface for resting a ladder thereon.

SUMMARY OF THE INVENTION

In view of the foregoing disadvantages inherent in the known types of devices for maintaining a level surface for resting a ladder thereon now present in the prior art, the present invention provides a new ladder leveling chock system construction wherein the same can be utilized for maintaining a level surface for resting a ladder thereon.

The general purpose of the present invention, which will be described subsequently in greater detail, is to provide a new ladder leveling chock system apparatus and method which has many of the advantages of the devices for maintaining a level surface for resting a ladder thereon mentioned heretofore and many novel features that result in a new ladder leveling chock system which is not anticipated, rendered obvious, suggested, or even implied by any of the prior art devices for maintaining a level surface for resting a ladder thereon, either alone or in any combination thereof.

To attain this, the present invention generally comprises a block with top and bottom faces, an end face, and a pair of side faces. The top and bottom faces converge together at an end vertex extending between the side faces opposite the end face. The bottom face has a resiliently deformable surface provided thereon. The top face is designed for resting a lower end of a rail of a ladder thereon and has a resiliently deformable gripping strip coupled thereto for frictionally enhancing contact between the top face and the lower end of the rail.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ladder leveling chock system apparatus and method which has many of the advantages of the devices for maintaining a level surface for resting a ladder thereon mentioned heretofore and many novel features that result in a new ladder leveling chock system which is not anticipated, rendered obvious, suggested, or even implied by any of the prior art devices for maintaining a level surface for resting a ladder thereon, either alone or in any combination thereof.

It is another object of the present invention to provide a new ladder leveling chock system which may be easily and efficiently manufactured and marketed.

It is a further object of the present invention to provide a new ladder leveling chock system which is of a durable and reliable construction.

An even further object of the present invention is to provide a new ladder leveling chock system which is susceptible of a low cost of manufacture with regard to both materials and labor, and which accordingly is then susceptible of low prices of sale to the consuming public, thereby making such ladder leveling chock system economically available to the buying public.

Still yet another object of the present invention is to provide a new ladder leveling chock system which provides in the apparatuses and methods of the prior art some of the advantages thereof, while simultaneously overcoming some of the disadvantages normally associated therewith.

Still another object of the present invention is to provide a new ladder leveling chock system for maintaining a level surface for resting a ladder thereon.

Yet another object of the present invention is to provide a new ladder leveling chock system which includes a block with top and bottom faces, an end face, and a pair of side faces. The top and bottom faces converge together at an end vertex extending between the side faces opposite the end face. The bottom face has a resiliently deformable surface provided thereon. The top face is designed for resting a lower end of a rail of a ladder thereon and has a resiliently deformable gripping strip coupled thereto for frictionally enhancing contact between the top face and the lower end of the rail.

Still yet another object of the present invention is to provide a new ladder leveling chock system that are easily portable by a user so that the user may use the system at various sites.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic side view of the present invention in use with a ladder to provide a horizontal surface of the ladder to rest on.

DESCRIPTION OF THE PREFERRED EMBODIMENT

Figure 1:
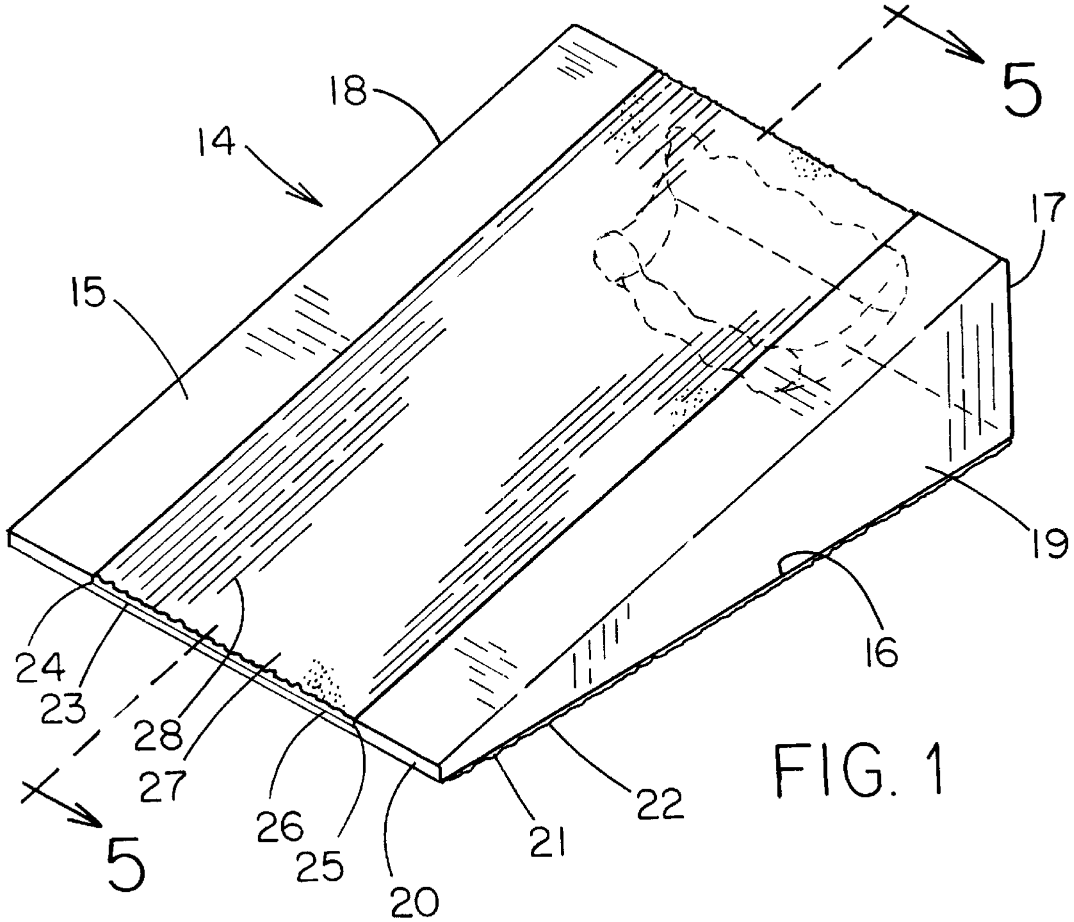
FIG. 1 is a schematic top perspective view of a ladder leveling chock system according to the present invention.

With reference now to the drawings, and in particular to FIGS. 1 through 6 thereof, a new ladder leveling chock system embodying the principles and concepts of the present invention will be described.

As best illustrated in FIGS. 1 through 6, the ladder leveling chock system generally comprises a block with top and bottom faces, an end face, and a pair of side faces. The top and bottom faces converge together at an end vertex extending between the side faces opposite the end face. The bottom face has a resiliently deformable surface provided thereon. The top face is designed for resting a lower end of a rail of a ladder thereon and has a resiliently deformable gripping strip coupled thereto for frictionally enhancing contact between the top face and the lower end of the rail.

In use, the ladder leveling chocks are designed for use with a ladder 10 having a spaced apart pair of substantial parallel elongate rails 11,12 and a plurality of spaced apart rungs 13 extending between the rails with each of the rails having a lower end for resting on a resting surface. The chocks are used to providing a stable and generally horizontal surface for resting a ladder on sloped resting surfaces.

In particular, each leveling chock comprises a generally triangular wedge-shaped block 14 having generally rectangular top and bottom faces 15,16, a generally rectangular end face 17, and a pair of generally triangular side faces 18,19. The top and bottom faces converge together at an end vertex 20 extending between the side faces opposite the end face. The top face is extended at an acute angle to the bottom face. The end face is extended substantially perpendicular to the bottom face. The side faces are extended substantially perpendicular to the bottom face and to the end face. Preferably, the end vertex is flatted to lie in a plane substantially parallel to the end face to help resist wear and tear on the end vertex.

Figure 4:
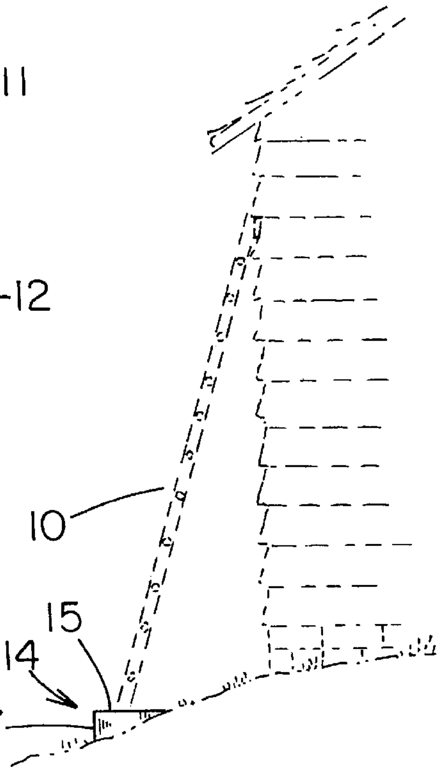

As best illustrated in FIG. 4, the bottom face is designed for resting on a sloped resting surface such as a ground surface such that the top face faces upwards from and generally horizontal to the resting surface. The bottom face has a substantially coextensive resiliently deformable surface 21 provided thereon. The resiliently deformable surface of the bottom face comprises a resiliently deformable plastic or rubber layer that may be coupled to the bottom face by fasteners or adhesive. The resiliently deformable surface of the bottom face has a plurality of substantially parallel gripping ridges 22 extending between the side faces substantially parallel to the end face. In use, the resiliently deformable surface and the gripping ridges of the resiliently deformable surface are designed for frictionally enhancing contact between the bottom face and the resting surface to prevent the block from slipping on the resting surface.

The top face is designed for resting a lower end of a rail of a ladder thereon as best shown in FIG. 4. The top face preferably has a generally rectangular depression 23 therein extending between the end face and the end vertex. The depression has a generally rectangular-shaped configuration comprising a spaced apart pair of side walls 24,25, and a bottom wall 26 connecting the side walls of the depression together, and a pair of opposite open ends at the end face and the end vertex. The side walls of the depression preferably lie in planes substantially parallel to the side faces with the bottom wall of the depression preferably lying in a plane substantially parallel to the top face.

A generally resiliently deformable gripping strip 27 substantially occupies the space defined by the depression. The gripping strip is coupled to the block along the side walls and bottom wall of the depression either by friction fitting and/or an adhesive applied therebetween. The gripping strip has a plurality of substantially parallel gripping ridges 28 extending between the end face and the end vertex substantially parallel to the side faces.

The gripping strip and the gripping ridges of the gripping strip are designed for frictionally enhancing contact between the top face and the lower end of the rail of the ladder resting thereon to prevent the lower end of the rail from slipping on the top face. Preferably, the depression and the gripping strip is centered on the top face between the side faces and occupying an area between about one-quarter and about three quarters of the total area of the top face to center the lower end of the rail on the top face for optimizing the stability of the lower end of the rail on the block. Ideally, the depression and the gripping strip occupy an area of about one-half of the total area of the top face.

Figure 2:
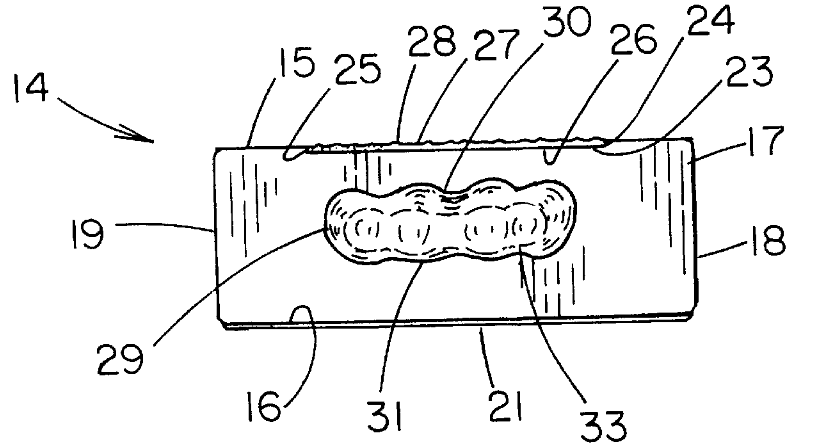
FIG. 2 is a schematic end view of the present invention.
Figure 3:
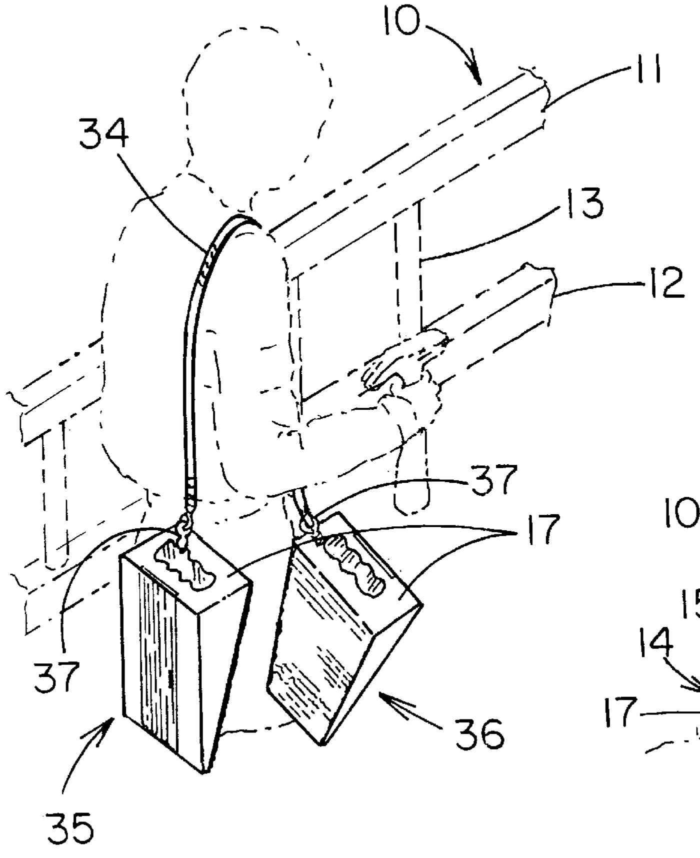
FIG. 3 is a schematic perspective view of a pair of the leveling chocks carried on the shoulder of a user with the carrying strap.
Figure 5:
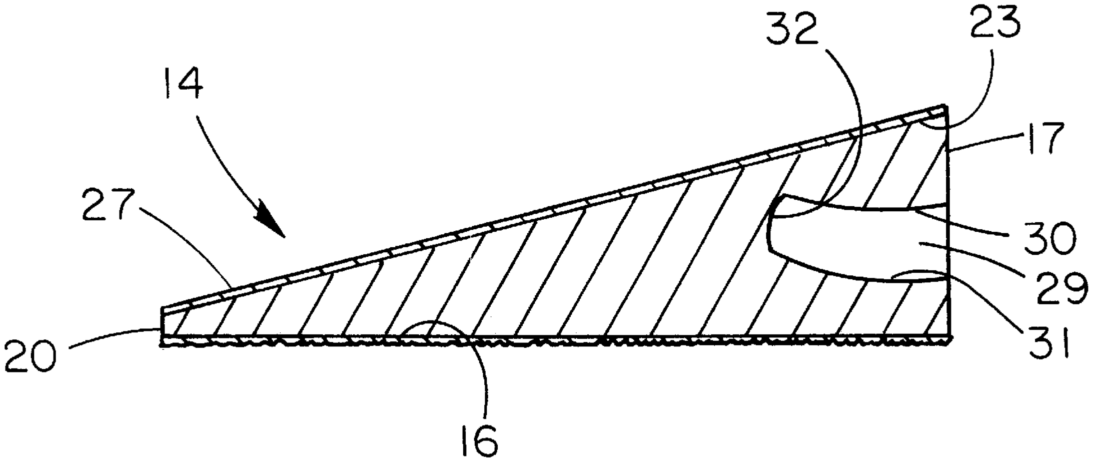
FIG. 5 is a schematic cross sectional view taken from line 5—5 of FIG. 1.

The end face preferably has a carrying cavity 29 therein for receiving fingers of a user therein to aid carrying of the block. As best illustrated in FIGS. 2 and 5, the carrying cavity has spaced apart and upwardly curving upper and lower surfaces 30,31 and an end surface 32 distal the end face. The upper and lower surfaces of the carrying cavity each have a plurality of finger grooves 33 defining a plurality of finger stalls each designed for receiving a finger of a user inserted into the carrying cavity for providing enhanced comfort and grip to a user carrying the block.

Optionally, an elongate flexible carrying strap 34 may be provided to connect first and second leveling chocks 35,36 together. The carrying strap has a pair of opposite ends with one end of the carrying strap coupled to the end face of the first leveling chock and the other end of the carrying strap coupled to the end face of the second leveling chock. Ideally, the end faces of the leveling chock each have an eye loop 37 coupled thereto with the ends of the carrying strap secured to the respective eye loops to couple the ends of the carrying strap to the respective end face. In use, the carrying strap is designed for carrying the first and second leveling blocks over a user's shoulder.

As best illustrated in FIG. 4, the lower end of one of the rails of the ladder is rested on the gripping strip of the top face of the first leveling chock. Similarly, the lower end of the other of the rails of the ladder is rested on the gripping strip of the top face of the second leveling chock. The leveling chocks provide a generally horizontal, stable, and slip-resistant surface for resting the lower ends of the rails of the ladder.

In an ideal illustrative embodiment, each block has a length defined between the end face and the end vertex of about 18 inches, a height defined at the end face between the top and bottom faces of about 6 inches, and a width defined between the side faces of about 10 inches for providing an optimal size for providing optimal stability to the lower ends of the rungs resting thereon and optimal slip resistance between the bottom face and the resting surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ladder leveling chock for resting a lower end of a rail of a ladder thereon, said ladder leveling chock comprising:

a block having top and bottom faces, an end face, and a pair of side faces, said top and bottom faces converging together at an end vertex extending between said side faces opposite said end face;

said bottom face having a resiliently deformable surface provided thereon;

said top face being adapted for resting the lower end of the rail of the ladder thereon and having a resiliently deformable gripping strip coupled thereto for frictionally enhancing contact between the top face and the lower end of the rail; and wherein said end face has a carrying cavity therein for receiving fingers of a user therein.

2. The ladder leveling chock of claim 1, wherein said top face is extended at an acute angle to said bottom face, said end face are extended substantially perpendicular to said bottom face, and said side faces are extended substantially perpendicular to said bottom face and to said end face.

3. The ladder leveling chock of claim 1, wherein said end vertex is flatted to lie in a plane substantially parallel to said end face.

4. The ladder leveling chock of claim 1, wherein said resiliently deformable surface of said bottom face has a plurality of gripping ridges extending between said side faces.

5. The ladder leveling chock of claim 1, wherein said top face has a depression therein extending between said end face and said end vertex, said gripping strip being located in said depression.

6. The ladder leveling chock of claim 5, wherein said depression has a spaced apart pair of side walls, and a bottom wall connecting said side walls of said depression together, said side walls of said depression lying in planes substantially parallel to said side faces, said bottom wall of said depression lying in a plane substantially parallel to said top face.

7. The ladder leveling chock of claim 1, wherein said gripping strip has a plurality of gripping ridges extending between said end face and said end vertex.

8. The ladder leveling chock of claim 1, wherein said carrying cavity has spaced apart and upwardly curving upper and lower surfaces and an end surface distal said end face, and wherein said upper and lower surfaces of said carrying cavity each have a plurality of finger grooves defining a plurality of finger stalls.

9. A ladder leveling chock system, comprising:

a ladder having a spaced apart pair of substantial parallel elongate rails and a plurality of spaced apart rungs extending between said rails, each of said rails having a lower end for resting on a resting surface;

a plurality of leveling chocks each comprising:

a generally triangular wedge-shaped block having generally rectangular top and bottom faces, a generally rectangular end face, and a pair of generally triangular side faces;

said top and bottom faces converging together at an end vertex extending between said side faces opposite said end face;

said top face being extended at an acute angle to said bottom face;

said end face being extended substantially perpendicular to said bottom face;

said side faces being extended substantially perpendicular to said bottom face and to said end face;

said end vertex being flatted to lie in a plane substantially parallel to said end face;

said bottom face being rested on a resting surface such that said top face faces upwards from the resting surface;

said bottom face having a substantially coextensive resiliently deformable surface provided thereon;

said resiliently deformable surface of said bottom face having a plurality of substantially parallel gripping ridges extending between said side faces substantially parallel to said end face;

said resiliently deformable surface and said gripping ridges of said resiliently deformable surface frictionally enhancing contact between said bottom face and the resting surface;

said top face having a generally rectangular depression therein extending between said end face and said end vertex;

said depression having a spaced apart pair of side walls, and a bottom wall connecting said side walls of said depression together;

said side walls of said depression lying in planes substantially parallel to said side faces, said bottom wall of said depression lying in a plane substantially parallel to said top face;

a generally resiliently deformable gripping strip substantially occupying said depression, said gripping strip being coupled to said block;

said gripping strip having a plurality of substantially parallel gripping ridges extending between said end face and said end vertex substantially parallel to said side faces;

said gripping strip and said gripping ridges being adapted for frictionally enhancing contact between said top face and the lower end of the rail of the ladder resting thereon;

said end face having a carrying cavity therein for receiving fingers of a user therein;

said carrying cavity having spaced apart and upwardly curving upper and lower surfaces and an end surface distal said end face;

said upper and lower surfaces of said carrying cavity each having a plurality of finger grooves defining a plurality of finger stalls;

an elongate flexible carrying strap connecting first and second leveling chocks together;

said carrying strap having a pair of opposite ends, one end of said carrying strap being coupled to said end face of said first leveling chock, and the other end of said carrying strap being coupled to said end face of said second leveling chock;

said lower end of one of said rails of said ladder being rested on said gripping strip of said top face of said first leveling chock; and said lower end of the other of said rails of said ladder being rested on said gripping strip of said top face of said second leveling chock.

* * * * *